Aug. 6, 1929. J. A. GRAY Re. 17,397

CREASED FLANGE

Original Filed June 11, 1920

Inventor:-
James A. Gray
John C. Carpenter
Atty:-

Reissued Aug. 6, 1929. Re. 17,397

UNITED STATES PATENT OFFICE.

JAMES A. GRAY, OF SAN FRANCISCO, CALIFORNIA, ASSIGNOR TO AMERICAN CAN COMPANY, OF NEW YORK, N. Y., A CORPORATION OF NEW JERSEY.

CREASED FLANGE.

Original No. 1,636,957, dated July 26, 1927, Serial No. 388,121, filed June 11, 1920. Application for reissue filed November 9, 1928. Serial No. 318,288.

This invention relates to the art of making cans and more particularly to the provision of means eliminating a condition which in the past has frequently been found to be the cause of leaks in the double seam securing the can end to the can body.

The invention relates more particularly to cans of the sanitary type wherein the ends are secured in place without solder and by the interfolding of flanges formed on the bodies and ends and into a seam into which is also included a gasket of compound paper or other packing material. Tin cans of commerce are formed from sheet metal cut to suitable sized blanks and secured together along a seam running throughout the length of the can. These edges at the ends are soldered together in overlapped relation and when the two overlapping edges are bent to form the flange it has been found that frequently there is a slipping or stretching action of the soldered joint which forces the overlapping part having the sharper bend down beneath the overlapping part enclosing it in the inverted U-shaped construction it assumes in the finished seam. This condition has not infrequently provided a droop as well as a slight bulge at this point in the double end seam and at times has been sufficient to prevent catching of the curled flange of the cover behind or within this U-shaped flange of the body with the result that leakage has occurred.

My present invention has for a particular object the construction and arrangement of these seam parts in a manner to prevent this relative movement between the overlapping parts included within the seam so that this droop will be substantially eliminated and ample opportunity afforded for the engagement within and behind the depending double flange at the side seam of the curled flange of the can end. My invention contemplates in this respect imparting a preliminary bending or even if desired slight weakening or scoring along the line of flange bend at the end of the body so that the inner lap member may stretch slightly in the flanging and seaming operation and the outer lap member may be contracted slightly in the flanging action and each act to restrain the action of the other to the end that they will extend down in the finished seam in substantial uniformity with the other portions of the body flange.

Another important object of my invention is the improvement of the general double seam construction by providing a condition whereby, when the flange is formed on the can body, it will be of an accurately predetermined area and the bend will always occur at the same point on the body. It has been found in the manufacture of sanitary cans where flanges are bent on the ends of the bodies without a preliminary creasing or scoring of the metal, as I have done in this invention, that the bend will occur at varying points, in some instances making a long flange and in other instances a short flange. This variation in flange area or flange length is detrimental to obtaining the best results in finally closing or attaching the ends to the cans. The flanges of the covers which interlock with the flanges of the bodies are of almost absolutely constant width and area, so that this portion of the seam does not vary, but there has always been some variance in the amount of flange incorporated in the interlocking seam where the bend of the flange has not been preliminarily determined. When, however, the body is creased or scored in accordance with my present invention the line of bend is predetermined and the flanges resulting being of substantially exact uniformity so that both the flanges of the can ends and the flanges of the can bodies to be interfolded are of substantially uniform predetermined dimension and on this account co-operate in the interlocking of the two to form double seams which will be heremetic and non-leaking.

Another important object of my invention is the improvement of the side seam construction of the can body, to the end that tendency of the seam parts to slip or slide over each other as an incident to the flanging will be minimized. The invention particularly relates in this regard to side seams of the combined lock and lap type, wherein the major portion of the seam is formed by interfolding or interhooking the edges of the body blank, and the end parts of the seam are formed by merely overlapping blank sections, the whole being soldered after the body is given its final form and the lock portion of the seam tightly compressed. It will be understood, of course, that in forming the lock portion of the seam the edges of the blank entering into it are set off from the lap portions and bent to hook formation. The lock portion of the seam, by reason of this hook construction, is of four thicknesses in section, while the lap portion is, of course, only of two thicknesses. The junction of the lock and lap portions, therefore, requires a reduction of seam thickness from four to two layers of tin plate. The ends of the interengaged hook portions of the blank have in the past terminated together, so that an abrupt drop or compression of the metal was required at the junction between the lock and lap seam portions. In commercial manufacture, it has been found that a small cavity is provided at the ends of the hooked parts thus constructed, and it has been found difficult to fill such cavity with solder.

My invention has for an important object the arrangement of the hooked ends so as to reduce materially the size of such cavity, thereby insuring that the same is filled with solder in the soldering operation. This feature of invention both minimizes the amount of solder needed in the making of the can and also insures against the slipping of the seam parts in the flanging operation.

Another important object of the invention is the accomplishment of these results without greatly increasing the cost of production of the can or depreciating in any manner its hermetic qualities in other respects.

Numerous other objects and advantages of the invention will be apparent as it is better understood from the following description when considered in connection with the accompanying drawing illustrating a preferred embodiment thereof.

Referring to the drawings.

For the purpose of illustrating my invention, I have shown on the drawings a can in which it is embodied and which comprises a body 11 formed of a sheet of material bent to cylindrical form and having its vertical edges interengaged in a side seam formed in part of a central lock portion 12 and the end lapped portion 13 after the body is formed. The edges of the blank entering into the lock portion 12 are preferably of either slightly different length or are so positioned that they are slightly out of registration each with its companion. In the forming of the seam, as will be readily apparent, this arrangement permits of a gradual sloping of the innermost lock seam part with respect to the outermost lock seam part at each junction of the lock and lap seam portions of the seam, and instead of one large cavity two minute ones are provided. In the sweating of the solder into the seam in the soldering operation, these small interstices or cavities are readily filled with solder. It will be apparent that not only is there a saving of solder in this operation, but that the seam parts are resultantly so arranged as to more fully sustain the strains of bending along their length. In other words, this arrangement better resists the pull upon the inner lap seam part in the flanging operation.

Figure 1:
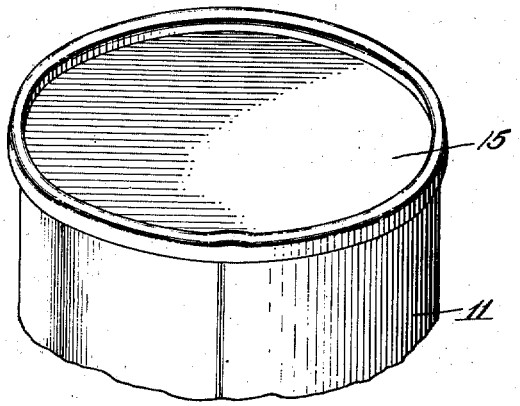
Figure 1 is a perspective view of a can embodying my present invention showing the cover seamed in position.
Figure 2:
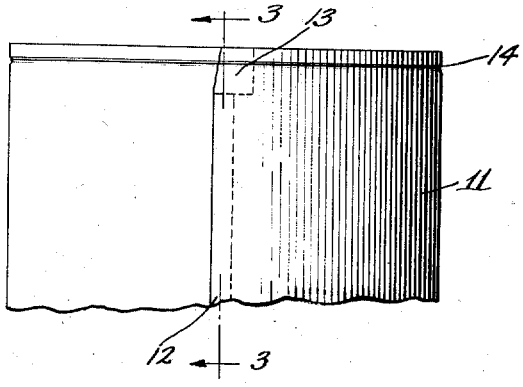
Fig. 2 is a side elevation showing the body before the flange is formed and after scoring on the line of flange bend.
Figure 3:
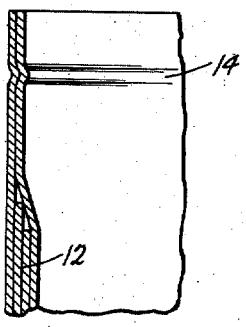
Fig. 3 is a section enlarged and taken substantially on the line 3—3 of Fig. 2.
Figure 5:
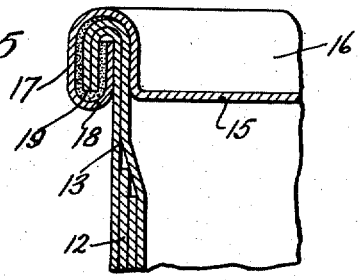
Fig. 5 is a view similar to Fig. 4 and showing the arrangement in the finished seam.
Figure 4:
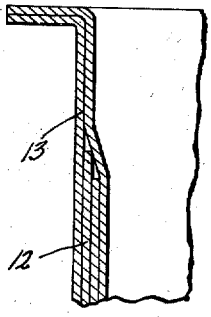
Fig. 4 is a similar section showing the flange construction at the side seams after the flange is formed.

Score or bend lines are provided near each end and at a distance therefrom equal to the depth of the flange as may be seen upon viewing Fig. 2. These lines may be produced in the sheet metal of the blank before it is formed into a can body, or they may be produced after the body forming operation and in or on the cylindrical or otherwise shaped body. These score or bend lines (indicated at 14) may be formed by any suitable mechanism and are preferably of a character which causes deflection or scoring of both overlapping parts at the seam ends. Thereafter the body is flanged in the usual manner and it will be found that in this flanging a sharp bend results about the can on the score line and also that the outer edges of the overlapping parts at the side seam will be arranged in circumferential registration as may be seen on viewing Fig. 4. The cover is then applied in the usual fashion and it is composed as is customary of the central body part 15 having a cylindrical shoulder 16 adapted to be disposed within the open end of the top and an outwardly extending flange 17 therebeyond. This flange is curled in at its edge, as indicated at 18, and is preferably provided with a gasket 19 or other suitable packing. The double seaming operation which consists in bending down the flanges and pressing them in against reacting pressure upon the shoulder of the can end causes the part to assume the relation shown on a large scale in Fig. 5.

The material of the overlapping side seam parts in this action undergoes a relative stretching and contraction and remains substantially in horizontal registration to the remainder of the body flange in the finished seam. Thus constructed there is no difficulty in insuring the engagement of the curled part of the cover flange behind the downturned body flange and leakage is thus prevented.

It is thought that the invention and many of its attendant advantages will be better understood from the foregoing description and it will be apparent that various changes may be made in the form, construction and arrangement of the parts without departing from the spirit and scope of the invention or sacrificing its material advantages, the form hereinbefore described being merely a preferred embodiment thereof.

I claim:

1. A process of making cans wherein the body and end are provided with flanges adapted to be interfolded to form an hermetic seam, which consists in forming a cylindrical body of sheet metal with the edges secured together in a side seam, creasing the material across the side seam at the point of flange-bend whereby the inner overlapping part may stretch in being bent to provide the body-flange, forming a flange on said body, and seaming the end in place on said body.

2. A process of making cans wherein the body and end are provided with flanges adapted to be interfolded to form an hermetic seam, which consists in weakening the material across the seam at the point of flange bend without interrupting the continuity thereof, whereby the overlapping parts may remain in the relation assumed before flanging and after the flange is formed, forming a flange on said body, and securing the end in place.

3. A process of making cans wherein the body and end are provided with flanges adapted to be interfolded to form an hermetic seam, which consists in scoring the material across the seam at the point of flange bend, without interrupting the continuity thereof, whereby the overlapping parts may remain in the relation assumed before flanging and after the flange is formed, forming a flange on said body, and securing the end in place.

4. A can body having a flange adapted to be interfolded with the flange of a can end to form a tight hermetic double seam, the material of the body being preliminarily creased across the side seam and at the junction of the flange and body without interrupting the continuity thereof to permit the overlapping parts of the side seam in the flange to have a greater capacity of yielding in the flanging operation.

5. A can body having a longitudinally extending side seam and provided with a flange at an end for seaming with the flange of the can end, said flange at the side seam being creased transversely and disposed at a sharp angle with the body and with the edges of the overlapping parts in registration.

6. A process of forming can bodies for double seaming, so that the length of the body flange and the height of the body will be substantially uniform, which consists in weakening the stiffness of the wall of the can body, without the removal of any of the metal thereof, and before the application of the cover, so as to give to said wall a predisposition to bend along a horizontal line which is at a distance from the end of the can body substantially equal to the desired outward extent of the body flange.

7. A can body, comprising a metal sheet having its edges joined in a lock and lap seam, with a lock seam portion intermediate lap seam portions, the ends of the members entering into the lock seam portion being out of registration axially of the can and substantially filling the junction between the full lock seam portion and a full lap seam portion.

JAMES A. GRAY.